United States Patent [19]

Young

[11] Patent Number: 5,606,771
[45] Date of Patent: Mar. 4, 1997

[54] FLEXIBLE GUIDE FOR A SLIDING DOOR OF A VEHICLE

[75] Inventor: Colin J. Young, Dearborn, Mich.

[73] Assignee: Ford Motor Company, Dearborn, Mich.

[21] Appl. No.: 414,160

[22] Filed: Mar. 31, 1995

[51] Int. Cl.$^6$ .................................................. A47H 15/00
[52] U.S. Cl. .............................. 16/90; 16/82; 292/341.12
[58] Field of Search ................................ 16/90, 85, 82, 16/86 A, DIG. 10, DIG. 17, DIG. 20; 292/341.12, 216, 340, DIG. 73, DIG. 56, DIG. 39

[56] References Cited

U.S. PATENT DOCUMENTS

| | | | |
|---|---|---|---|
| 1,089,193 | 3/1914 | Ervien | 292/DIG. 73 |
| 1,337,042 | 4/1920 | Cheston | 16/86 A |
| 1,624,960 | 4/1927 | Maise | 16/86 A |
| 1,676,599 | 7/1928 | Breneman | 16/86 A |
| 2,485,393 | 10/1949 | Locke | 16/90 |
| 5,125,698 | 6/1992 | Thau | 292/341.12 |

FOREIGN PATENT DOCUMENTS

| | | | |
|---|---|---|---|
| 2478718 | 9/1981 | France | E05B 65/20 |
| 57-147923 | 9/1982 | Japan | B60J 5/06 |
| 388106 | of 1931 | United Kingdom | 292/DIG. 39 |

*Primary Examiner*—Chuck Y. Mah
*Attorney, Agent, or Firm*—Roger L. May; Daniel M. Stock

[57] ABSTRACT

A guide mechanism for a sliding door of a vehicle includes a wedge with a protruding blade of thickness t fastened to an edge portion of the door, and a guide body fastened to a header of the vehicle. The vehicle header and edge portion of the door are adjacent one another when the door is in a closed position. First and second flexible wings are connected to the guide body forming a pair of wings defining a slot between the first and second wings with the wings separated a minimum distance, $\delta_0$, across the slot. First and second flanges respectively connected to the first and second wings extend away from one another forming a lead-in channel having a dimension greater than the minimum distance, $\delta_0$, for guiding the blade to engage the slot when the door is in the closed position. Making the blade thickness, t, greater than the minimum distance, $\delta_0$, across the slot causes each of the wings to exert pressure on the blade when the blade is positioned dead center so that movement between the door and header can occur without breaking contact between the wings and the blade thereby minimizing rattling and noise.

7 Claims, 3 Drawing Sheets

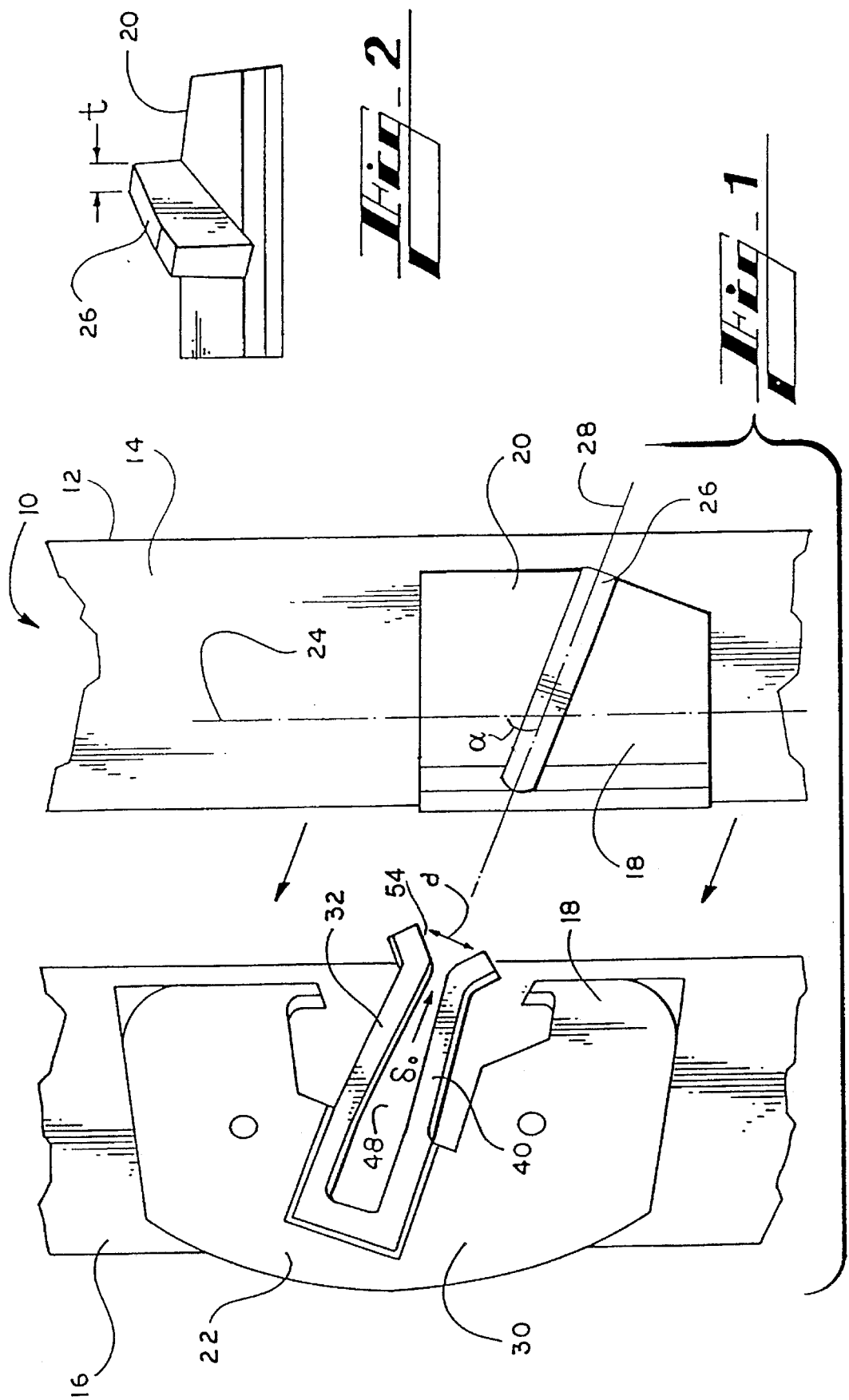

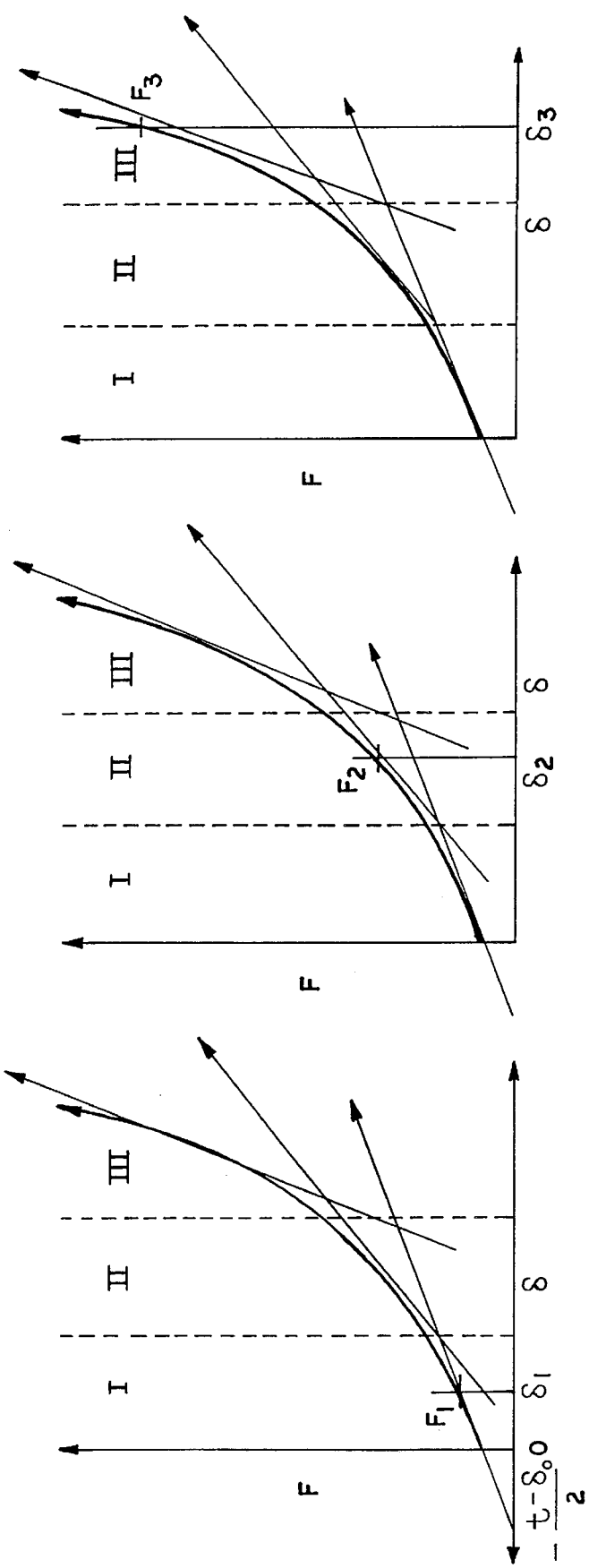

5,606,771

FLEXIBLE GUIDE FOR A SLIDING DOOR OF A VEHICLE

FIELD OF THE INVENTION

The present invention relates to a noise suppressing guide mechanism for a sliding door of a vehicle.

BACKGROUND OF THE INVENTION

It is desirable to have a vehicle door that does not rattle or squeak during normal vehicle operation. Rattling occurs because vehicle components are not fitted perfectly but are assembled within certain tolerances or build variations. Sliding doors typically have a two-part guide mechanism, constructed within certain tolerances, with one part attached to the door and the other part attached to the vehicle header. To reduce rattling, one or both parts may be rubber coated or employ a coil spring. While coil springs and rubber coatings do help reduce rattling, they require more parts which increases the opportunity for noise generation and, require additional manufacturing steps which increase manufacturing time. Accordingly, it will be appreciated that it would be highly desirable to have a simple device for preventing rattling of a sliding vehicle door that does not require additional parts or manufacturing steps.

SUMMARY OF THE INVENTION

The present invention is directed to overcoming one or more of the problems set forth above. Briefly summarized, according to one aspect of the present invention, a guide mechanism for a sliding door of a vehicle, wherein the vehicle has a header and the door has an edge portion adjacent the header when the door is in a closed position, comprises a wedge having a blade of thickness t protruding therefrom and being fastened to the edge portion of the door, and a guide body fastened to the header. First and second flexible wings connected to the guide body form a pair of wings defining a slot therebetween with the wings being separated a minimum distance, $\delta_0$, across the slot. First and second flanges respectively connected to the first and second wings extend away from one another forming a lead-in channel having a dimension d greater than the blade thickness, t, and greater than the minimum distance, $\delta_0$, for guiding the blade to engage the slot when the door is in the closed position.

Making the blade thickness t greater than the minimum distance, $\delta_0$, across the slot causes each of the wings to exert pressure on the blade when the blade: is positioned dead center so that movement between the door and header can occur without breaking contact between the wings and the blade. Maintaining contact between the wings and blade minimizes rattling and noise.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

FIG. 1 is a diagrammatic plan view of a preferred embodiment of an open vehicle door and header incorporating a guide mechanism according to the present invention.

FIG. 2 is a front view of the wedge portion of the guide mechanism of FIG. 1.

FIG. 7 is graphical illustration of force and displacement response for the displacement of FIG. 4.

FIG. 8 is graphical illustration of force and displacement response for the displacement of FIG. 5.

FIG. 9 is graphical illustration of force and displacement response for the displacement of FIG. 6.

DETAILED DESCRIPTION OF THE PREFERRED EMBODIMENTS

Figure 3:
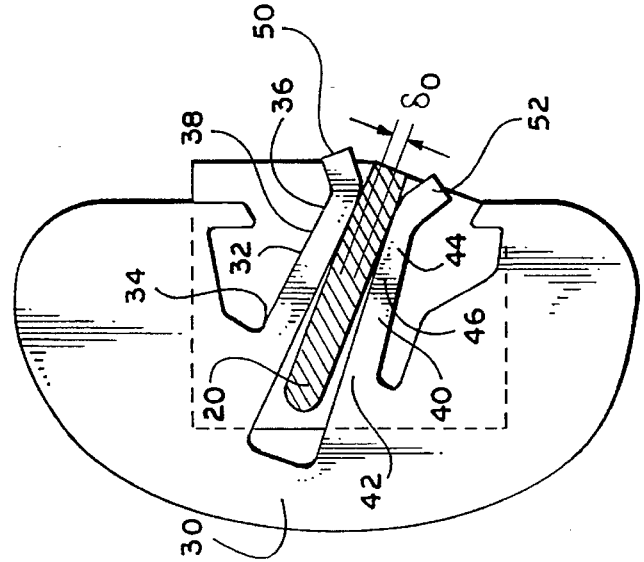
FIG. 3 is a plan view similar to FIG. 1 but simplified to illustrate engagement of the wedge and guide body when the door is closed.

Referring to FIGS. 1–3, a vehicle, such as a cargo or passenger van 10, is equipped with a sliding door 12 shown unlatched. The unlatched door 12 moves in the direction of the arrows for latching engagement. When closed and latched, the top edge 14 of the door 12 is positioned adjacent the header 16 of the vehicle 12 which functions as a frame for the door 12.

A guide mechanism 18 assists in closing the door 12, helps compensate for manufacturing variations helps reduce peak loads input to sheet metal components, and reduces squeaks and rattles that sometimes plague sliding doors. The guide mechanism 18 includes a wedge member 20 attached to the door 12 and a guide member 22 attached to the header 16. The wedge member 20 has an axis 24 extending generally parallel to the longitudinal axis of the vehicle and openings for fastening the wedge member 20 to the top edge 14 of the door 14. The openings may be slotted to allow for adjustment of the wedge member 20. A blade 26 has a longitudinal axis 28 and thickness, t, and is mounted on the wedge member 20 with the axes 24, 28 forming an acute angle, $\alpha$.

The guide member 22 includes a guide body 30 preferably with openings for receiving screws for fastening the guide member 22 to the header 16. Preferably, the guide body is constructed of an acetal resin and the wedge of nylon, but either or both may be metal. When the guide body is metal it may be attached to the header by welding or the like.

A first flexible wing 32 has a bottom portion 34 connected to the guide body 30, a distal tip portion 36 and a curved middle portion 38 intermediate the tip and bottom portions 36, 34. A second flexible wing 40 also has a bottom portion 42 connected to the guide body 30, a distal tip portion 44 and a curved middle portion 46 intermediate the tip and bottom portions 46, 44. The second wing 40 is spaced from the first wing 32 forming a pair of wings defining a slot 48 therebetween. The wings are separated a minimum distance, $\delta_0$, across the slot 48 measured at the tip portions 36, 44.

A first flange 50 extends outwardly from the first wing tip 36 away from the slot 48 and a second flange 52 extends outwardly from the second wing tip 46 away from the slot 48. By this construction the wings have a general horseshoe or U-shape with the legs of the U curving inward toward one another until separated by minimum distance, $\delta_0$, but, unlike the upturned tips of a horseshoe, the first and second flanges 50, 52 angle away from the slot 48 and from one another to form a lead-in channel 54 for guiding the blade 26 into the slot 48. The lead-in channel 54 has a width dimension, d, greater than the blade thickness, t, and the minimum distance, $\delta_0$, so that $d>t>\delta_0$. Because the blade thickness is greater than the minimum slot distance, the wings contact the blade and exert pressure on the blade as the blade is guided into the slot. Each of the wings exerts pressure on the blade when the blade is positioned dead center in the slot between the wings so that a small amount of movement, $\delta$, where $\delta=\frac{1}{2}(t-\delta_0)$, can occur between the door and header without breaking contact between the whigs and the blade. At dead center the wings exerts equal pressure on the blade.

Figure 6:
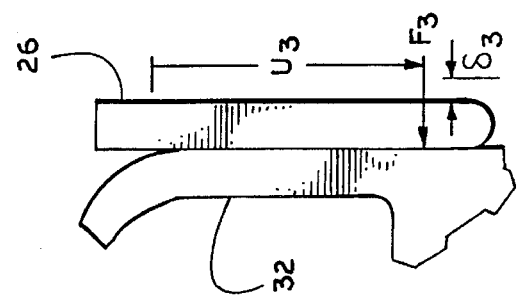
FIG. 6 is a diagram similar to FIGS. 4 and but for a third amount of door displacement, $\delta_3$, with $\delta_3 > \delta_2 > \delta_1$.
Figure 5:
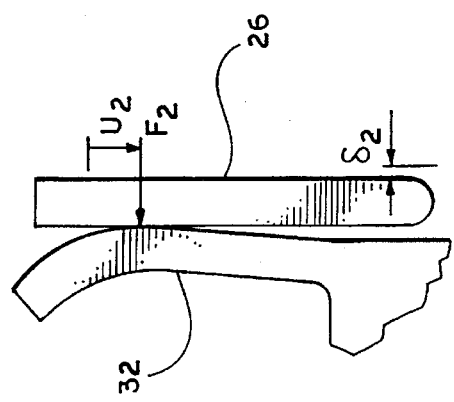
FIG. 5 is a diagram similar to FIG. 4 but for a second amount of door displacement, $\delta_2$, with $\delta_2 > \delta_1$.
Figure 4:
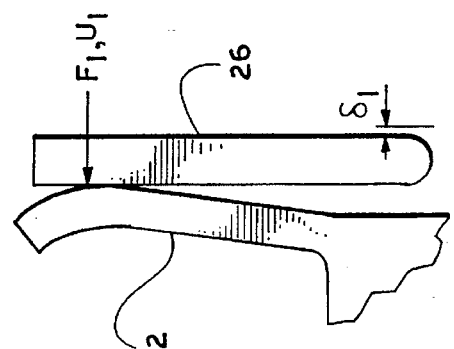
FIG. 4 is a diagram illustrating forces and contact between the wedge blade and guide body resilient wing for a first amount of door displacement, $\delta_1$, deemed normal door fit.

Referring to FIGS. 4–6, the blade 26 moves in a direction toward the first wing 32 in response to relative movement between the door 12 and header 16 with the first wing 32 responding by straightening the curved middle portion 38 to increase area of contact with the blade 26 and shift center of pressure, F, downward a distance, U, toward the guide body 30 effectively stiffening the first wing 32. FIG. 4 shows the initial center of pressure indicated by arrow $F_1$ at position $U_1$, where $F_1$ is the initial force acting in the direction of the arrow. Because pressure is force acting on an area, the arrow for $F_1$ indicates the center of pressure. FIG. 5 shows the center of pressure shifted downward a distance $U_2$ and FIG. 6 shows pressure shifted downward a distance $U_3$. The center of pressure shifts as the wing deflects.

There are three distinct regions of movement as shown in FIGS. 7–9 which depict the three $\delta$ regions. FIG. 7 shows the first region which is a door fitting error adjustment region wherein $0\leq\delta<\delta_1$, and is the maximum door fit error, laterally, the guide assembly is designed to accommodate. In this region the blade contacts both wings and increases nearly linearly with wing displacement. FIG. 8 shows the second region which is an energy absorbing region for lateral displacements where $\delta_1\leq\delta<\delta_2$. The guide assembly absorbs the energy of movement at a rising rate because of the downward shift of the center of pressure. It is anticipated that the upper limit, $\delta_2$, would be reached during only the most severe normal use of the vehicle. FIG. 9 shows the third region which is a constraint region wherein $\delta_2\leq\delta<\delta_3$. In extreme loading cases the wing flexes fully back and the loads transfer to the guide body thereby preventing the wing from breaking. During off road use or during high speed on a rough road, slight clicking may occur because the wedge loses contact with the wings as the wedge moves from side to side. Such clicking will not be noticeable because of a heightened noise level in the vehicle as a whole during extremely rough use.

Operation of the present invention is believed to be apparent from the foregoing description and drawings, but a few words will be added for emphasis. The door guide mechanism is used to transfer body loads to the door. The guide containing a slot mounts on the header and the wedge with the raised blade mounts on the door. When the door is closed, the blade on the wedge mates with the slot in the guide. The sides of the slot are flexible wings that allow for a certain amount of variation in door position. The lead-in channel helps guide the blade into the slot. As the wings exert a slight pressure on the blade, even when the blade is dead center, a small amount of lateral movement between the door and header is possible (while closed) without the wings breaking contact with the blade. Thus, constant contact between the blade and wings is maintained and rattles are prevented.

It can now be appreciated that there has been presented a two-piece noise reducing guide mechanism for a sliding door of a vehicle. One piece is a wedge fastened to the door with a protruding blade for cooperating with the second piece which is a guide body fastened to the vehicle header. Flexible wings extending from the guide body define a slot that receives the blade. The wings exert pressure on the blade and deflect as the blade moves in response to rattling motion of the door relative to the header. The pressure exerted varies directly with the magnitude of rattling motion and varies nonlinearly for rattling motion above a certain magnitude calculated to be encountered during normal operation of the vehicle.

While the invention has been described with particular reference to a cargo or passenger van door, it is apparent that the guide mechanism is easily adapted to other sliding doors to prevent rattling. As is evident from the foregoing description, certain aspects of the invention are not limited to the particular details of the examples illustrated, and it is therefore contemplated that other modifications and applications will occur to those skilled in the art. For example, while nylon and acetal are disclosed as plastic material suitable for use in the present invention, other resinous materials with similar relevant physical and chemical properties may be used. It is accordingly intended that the claims shall cover all such modifications and applications as do not depart from the true spirit and scope of the invention.

What is claimed is:

1. A guide mechanism for a sliding door of a vehicle, said vehicle having a header, said door having an edge portion positioned adjacent said header when said door is in a closed position, said guide mechanism comprising:

a wedge having a blade protruding therefrom;

means for fastening said wedge to said edge portion of said door;

a guide body;

means for fastening said guide body to said header;

first and second flexible wings connected to said guide body thereby defining a slot between said first and second wings; and first and second flanges respectively connected to said first and second wings and extending away from one another forming a lead-in channel for guiding said blade to engage said slot when said door is in a closed position so that when said blade moves toward said first wing in response to relative movement between said door and header said first wing responds by flexing to shift center of pressure downward toward said guide body effectively stiffening said first wing.

2. A guide mechanism, as set forth in claim 1, wherein said wings exert pressure equally on said blade when said blade is centered in said slot between said wings and exert pressure unequally in response to movement between said door and header that causes the blade to move in a direction toward said first wing and away from said second wing with said first wing exerting greater pressure than said second wing.

3. A guide mechanism, as set forth in claim 2, wherein, when said wings exert pressure equally on said blade, the pressures are centered about points immediately adjacent said lead-in channel.

4. A guide mechanism, as set forth in claim 2, wherein, when said first wing exerts pressure on said blade that pressure varies with a center of pressure, said blade must overcome greater pressure to move an incremental distance when said center of pressure is nearer said guide body than said lead-in channel.

5. A guide mechanism for a sliding door of a vehicle, said vehicle having a header, said door having an edge portion positioned adjacent said header when said door is in a closed position, said guide mechanism comprising:

an wedge member having an axis and openings for fastening said wedge to said edge portion of said door;

a blade having an axis and thickness, t, mounted on said wedge member with said axes forming an angle, $\alpha$;

a guide body for fastening to said header;

a first flexible wing having a bottom portion connected to said guide body, a tip portion and a curved middle portion intermediate said tip and bottom portions;

a second flexible wing having a bottom portion connected to said guide body, a tip portion and a curved middle portion intermediate said tip and bottom portions, said second wing being spaced from said first wing thereby defining a slot therebetween, said wings being separated a minimum distance, $\delta_0$, across said slot at said tip portions;

a first flange extending outwardly from said first wing tip away from said slot; and a second flange extending outwardly from said second wing tip away from said slot, said first and second flanges forming a lead-in channel for guiding said blade into said slot, said lead-in channel having a width, d, greater than said blade thickness, t, and said minimum distance, $\delta_0$, so that $d>t>\delta_0$ and said wings contact said blade and exert pressure on said blade as said blade is guided into said slot whereby when said blade moves in a direction toward said first wing in response to relative movement between said door and header said first wing responds by straightening said curved middle portion to increase area of contact with said blade and shift center of pressure downward toward said guide body effectively stiffening said first wing.

6. A guide mechanism, as set forth in claim 5, wherein each of said wings exerts pressure on said blade when said blade is centered in said slot between said wings so that a small mount of movement, $\delta$, where $\delta=\frac{1}{2}(t-\delta_0)$, can occur between said door and header without breaking contact between said wings and said blade.

7. A sliding door and guide mechanism for a vehicle, said door having a header and an edge portion positioned adjacent said header when said door is in a closed position, said sliding door and guide mechanism comprising:

an wedge member fastened to said edge portion of said door;

a blade mounted on said wedge member;

a guide body fastened to said header;

a first flexible wing having a bottom portion connected to said guide body, a tip portion and a curved middle portion intermediate said tip and bottom portions;

a second flexible wing having a bottom portion connected to said guide body, a tip portion and a curved middle portion intermediate said tip and bottom portions, said second wing being spaced from said first wing thereby defining a slot therebetween;

a first flange extending outwardly from said first wing tip away from said slot; and a second flange extending outwardly from said second wing tip away from said slot, said first and second flanges forming a lead-in channel for guiding said blade into said slot, said wings contact said blade and exert pressure on said blade as said blade is guided into said slot whereby when said blade moves in a direction toward said first wing in response to relative movement between said door and header said first wing responds by straightening said curved middle portion to increase area of contact with said blade and shift center of pressure downward toward said guide body effectively stiffening said first wing.

* * * * *